United States Patent
Uchida

(10) Patent No.: US 9,261,803 B2
(45) Date of Patent: Feb. 16, 2016

(54) ELECTROPHOTOGRAPHIC BELT AND ELECTROPHOTOGRAPHIC IMAGE FORMING APPARATUS

(71) Applicant: CANON KABUSHIKI KAISHA, Tokyo (JP)

(72) Inventor: Kouichi Uchida, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/312,493

(22) Filed: Jun. 23, 2014

(65) Prior Publication Data

US 2014/0301759 A1    Oct. 9, 2014

Related U.S. Application Data

(63) Continuation of application No. PCT/JP2014/000495, filed on Jan. 30, 2014.

(30) Foreign Application Priority Data

Feb. 5, 2013  (JP) .................................. 2013-020642

(51) Int. Cl.
| | |
|---|---|
| G03G 7/00 | (2006.01) |
| C08K 5/00 | (2006.01) |
| C08L 101/12 | (2006.01) |
| G03G 15/00 | (2006.01) |
| G03G 15/16 | (2006.01) |
| C08K 5/19 | (2006.01) |

(52) U.S. Cl.
CPC ............... *G03G 7/0053* (2013.01); *C08K 5/00* (2013.01); *C08K 5/0041* (2013.01); *C08K 5/19* (2013.01); *C08L 101/12* (2013.01); *G03G 15/00* (2013.01); *G03G 15/16* (2013.01); *G03G 15/162* (2013.01); *G03G 15/1605* (2013.01); *G03G 2215/0129* (2013.01)

(58) Field of Classification Search
None
See application file for complete search history.

(56) References Cited

U.S. PATENT DOCUMENTS

| | | | | |
|---|---|---|---|---|
| 2009/0324277 A1* | 12/2009 | Ito | ................................. | 399/101 |
| 2010/0158584 A1* | 6/2010 | Ueno et al. | .................... | 399/313 |
| 2011/0249995 A1 | 10/2011 | Uchida et al. | | |
| 2012/0213536 A1* | 8/2012 | Takeuchi | ........................ | 399/45 |
| 2014/0197578 A1 | 7/2014 | Uchida | | |

FOREIGN PATENT DOCUMENTS

| | | |
|---|---|---|
| JP | 2001-042659 A | 2/2001 |
| JP | 2004-258444 A | 9/2004 |
| JP | 2005-015609 A | 1/2005 |
| JP | 2005-164674 A | 6/2005 |
| JP | 2010-054942 A | 3/2010 |
| JP | 2010-139650 A | 6/2010 |

OTHER PUBLICATIONS

International Preliminary Report on Patentability, International Application No. PCT/JP2014/000495, Mailing Date Aug. 20, 2015.

* cited by examiner

*Primary Examiner* — Clayton E Laballe
*Assistant Examiner* — Jas Sanghera
(74) *Attorney, Agent, or Firm* — Fitzpatrick, Cella, Harper and Scinto

(57) ABSTRACT

An electrophotographic belt which enables the suppression of bleeding of an electrolyte while minimizing influence on its surface smoothness. The electrophotographic belt showing electroconductivity resulting from dissociation of an electrolyte is made of a resin composition containing a crystalline resin as a binder resin, an oil-soluble dye and an electrolyte.

10 Claims, 4 Drawing Sheets

ELECTROPHOTOGRAPHIC BELT AND ELECTROPHOTOGRAPHIC IMAGE FORMING APPARATUS

CROSS-REFERENCE TO RELATED APPLICATIONS

This application is a continuation of International Application No. PCT/JP2014/000495, filed Jan. 30, 2014, which claims the benefit of Japanese Patent Application No. 2013-020642, filed Feb. 5, 2013.

BACKGROUND OF THE INVENTION

1. Field of the Invention

The present invention relates to an electrophotographic belt used as an intermediate transfer belt or the like of an electrophotographic image forming apparatus, and also relates to an electrophotographic image forming apparatus.

2. Description of the Related Art

An electrophotographic image forming apparatus uses, for example, an intermediate transfer belt which is used for carrying, on a surface thereof, toner images having been primarily transferred from electrophotographic photoconductive members and transporting the toner images to a secondary transfer region where the toner images are transferred to a transfer medium such as paper, or a transfer-transport belt which is used for carrying, on a surface thereof, a transfer medium such as paper, onto which a toner image is transferred and transporting the transfer medium. An electrophotographic belt used as such members is required to have electroconductivity according to the use of the electrophotographic belt. For the purpose, an electrophotographic belt to which electroconductivity is provided by producing the belt in such a manner that an electrolyte is dispersed in a binder resin has been proposed and utilized. In the electrophotographic belt to which electroconductivity is provided by incorporation of an electrolyte, however, the electrolyte or ions generated by dissociation of the electrolyte may gradually migrate toward the surface of the belt (this phenomenon is hereinafter referred to as "bleeding") as a result of applying a DC bias to the belt within the electrophotographic image forming apparatus (herein, an electrolyte and ions generated by dissociation of the electrolyte may be collectively referred to as "electrolyte").

The bleeding of the electrolyte may cause the electroconductivity of the electrophotographic belt to change with time. If the electrophotographic belt is used as an intermediate transfer belt, the electrolyte deposited on the surface as a result of the bleeding may affect the efficiencies of the primary transfer and the secondary transfer of toner images. Accordingly, Japanese Patent Application Laid-open No. 2010-139650 has proposed that hydrotalcite is added as a filler for suppressing the bleeding of an electrolyte.

SUMMARY OF THE INVENTION

According to examinations made by the present inventor, however, hydrotalcite, which is an inorganic substance, is not dissolved in a binder resin like an electrolyte, and therefore, if a large amount of hydrotalcite is added to a binder resin to suppress the bleeding, a part of the hydrotalcite may be present on a surface of the electrophotographic belt or in the vicinity of the surface, so that the surface of the electrophotographic belt may be excessively roughened. Accordingly, the present inventor has realized that it is necessary to develop a technique to suppress the bleeding of an electrolyte while reducing the influence on the surface property, more specifically, the degree of surface roughness, of an electrophotographic belt as much as possible.

The present invention is directed to providing an electrophotographic belt which enables the suppression of bleeding of an electrolyte while minimizing influence on the surface property.

The present invention is also directed to providing an electrophotographic image forming apparatus capable of stably forming high quality electrophotographic images.

According to an aspect of the present invention, there is provided an electrophotographic belt exhibiting electroconductivity resulting from dissociation of an electrolyte, comprising a resin composition containing: a crystalline resin used as a binder resin, an oil-soluble dye, and an electrolyte.

According to another aspect of the present invention, there is provided an electrophotographic image forming apparatus comprising an intermediate transfer belt, wherein the intermediate transfer belt is the above electrophotographic belt.

According to the present invention, an electrophotographic belt can be obtained which suppresses the bleeding of an electrolyte while minimizing the influence on the surface property. Also, according to the present invention, an electrophotographic image forming apparatus can be obtained which is capable of stably forming high quality electrophotographic images.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The present inventor has made examinations on a method for suppressing the bleeding of an electrolyte without using a filler of an inorganic substance like in Japanese Patent Application Laid-open No. 2010-139650.

As a result, the inventor has found that when a DC voltage is applied in the thickness direction of an electrophotographic belt made of a resin mixture containing a crystalline resin used as a binder resin and an electrolyte dispersed in the binder resin, the bleeding of the electrolyte is caused because of migration of the electrolyte in an amorphous region of the electrophotographic belt.

Figure 4A:
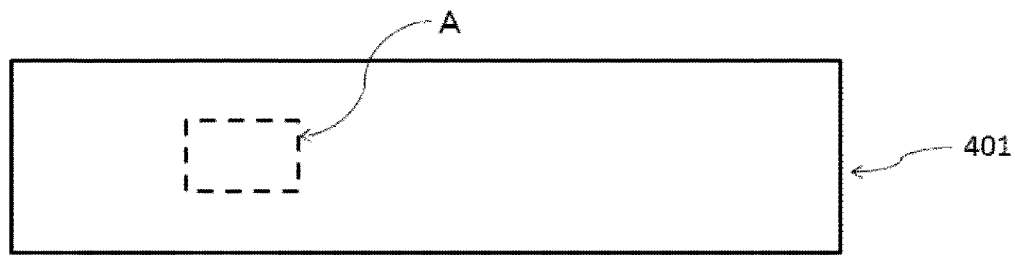
FIG. 4A is a schematic cross-sectional view of an electrophotographic belt according to the present invention.
Figure 4B:
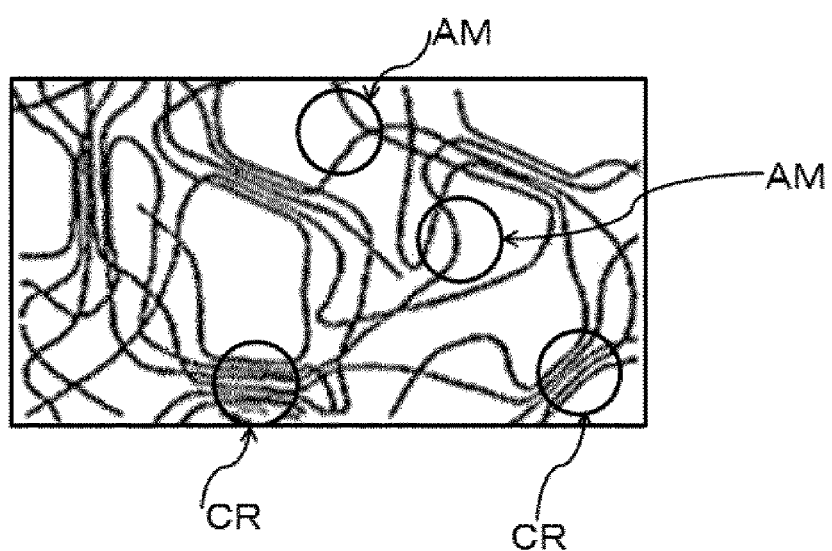
FIG. 4B is a diagram schematically illustrating a state of a binder resin in a cross-sectional area A of FIG. 4A.

FIG. 4A is a schematic cross-sectional view of an electrophotographic belt 401 of the present invention, and FIG. 4B is a diagram schematically illustrating a state of a binder resin in a cross-sectional area A of FIG. 4A. As illustrated in FIG. 4B, in the electrophotographic belt, there are a crystalline region (CR) in which polymer chains of the crystalline resin used as the binder resin are densely arranged and an amorphous region (AM) in which the polymer chains are randomly present.

The electrolyte cannot easily enter the crystalline region (CR) in which the polymer chains are densely arranged and hence is exclusively present in the amorphous region (AM). Besides, the electrolyte is considered to migrate through the amorphous region (AM) in the electrophotographic belt to bleed out.

Examinations were made on suppression of the bleeding of an electrolyte by allowing a substance having a bulky molecular structure to be present in an amorphous region (AM) which can be a passage for the electrolyte. Specifically, an electrophotographic belt was formed using a resin composition which was prepared by incorporating an oil-soluble dye together with an electrolyte into a crystalline resin used as a binder resin. As a result, it was found that the electrophotographic belt can satisfactorily achieve the aforementioned objects.

Specifically, the oil-soluble dye has good compatibility with the binder resin and hence can be made to be present in an amorphous region of the crystalline resin. Accordingly, differently from the case of hydrotalcite as described in Japanese Patent Application No. 2010-139650, the surface property of the electrophotographic belt is minimally or only slightly affected by the oil-soluble dye.

Furthermore, the oil-soluble dye has a bulky structure, and thus, if the oil-soluble dye is present in the amorphous region, the migration path of the electrolyte is considered to be blocked so that the bleeding of the electrolyte can be prevented. Owing to this, it is thought that the bleeding of the electrolyte is suppressed even if a DC voltage is applied to the electrophotographic belt in the thickness direction.

Moreover, the resin composition containing the oil-soluble dye in the crystalline resin shows an effect to lower the crystallization rate of the resin composition owing to the bulky structure of the oil-soluble dye. This effect is considered to be advantageous to controlling the roughening of the surface of the electrophotographic belt in using the resin composition for producing the electrophotographic belt.

Now, preferred embodiments of the present invention will be described in detail.

The electrophotographic belt of the present invention is made of a resin composition containing a crystalline resin used as a binder resin, an electrolyte and an oil-soluble dye. These materials will now be described.

<Crystalline Resin>

Resins are classified into crystalline resins and amorphous resins depending upon the presence of the crystalline structure. The crystalline resins have a crystalline component and an amorphous component. For example, resins a melting endothermic peak of which is clearly observed in the vicinity of a melting point thereof as measured with a DSC (differential scanning calorimeter) at a temperature increasing rate of 10° C./min, resins a peak of which is clearly observed for X-ray diffraction intensity when 2θ/ is between 5 and 50°, and the like can be defined as falling under the category of crystalline resins.

Examples of the crystalline resin include polyamide, polyacetal, polybutylene terephthalate, polybutylene naphthalate, polyethylene terephthalate, polyethylene naphthalate, polylactic acid, syndiotactic polystyrene, polyphenylene sulfide, polyether ether ketone, liquid crystalline polymer, fluororesins such as tetrafluoroethylene, polyvinylidene fluoride and ethylene tetrafluoroethylene, and polyether nitrile. The resins may be subjected to copolymerization or modification as long as the their crystallinity is lost as little as possible. Besides, these resins may be used singly, or in combination of two or more of the resins.

The content of the crystalline resin is preferably 50% by mass or more, more preferably 60% by mass or more, and yet more preferably 70% by mass or more based on the total mass of the resin composition. In addition, the upper limit of the content of the crystalline resin is, in consideration of the content of the electrolyte for showing the electroconductivity required for the electrophotographic belt, preferably 98% by mass or less, more preferably 95% by mass or less, and yet more preferably 90% by mass or less.

<Electrolyte>

The electrolyte is a substance that shows, when added to the crystalline resin, electroconductivity through dissociation into positive ions and negative ions. Specific examples of the electrolyte include the following: quaternary ammonium salts such as tetraethylammonium, tetrabutylammonium, lauryl trimethyl ammonium, stearyl trimethyl ammonium, octadecyl trimethyl ammonium, dodecyl trimethyl ammonium, hexadecyl trimethyl ammonium, benzyl trimethyl ammonium, modified aliphatic dimethyl ethyl ammonium, and lauroyl aminopropyl dimethyl ethyl ammonium; perchlorates, chlorates, hydrochlorides, bromates, iodates, fluoroborates, sulfates, alkyl sulfates and carboxylates of alkali metals or alkali earth metals; sulfonates of perfluoroalkyl, perfluoroalkenyl and the like; carboxylates of perfluoroalkyl, perfluoroalkenyl and the like; and quaternary ammonium salts of perfluoroalkyl, perfluoroalkenyl and the like; sulfonyl imide, sulfonyl methide, and trifluoromethyl sulfate. One of these may be used singly, or two or more of these may be used in combination. Among the aforementioned examples, quaternary ammonium salt of alkyl sulfate, perfluoroalkyl sulfonate, carboxylates of perfluoroalkyl, perfluoroalkenyl and the like, quaternary ammonium salts of perfluoroalkyl, perfluoroalkenyl and the like can be preferably used.

The content of the electrolyte, based on the total mass of the resin composition, is preferably 0.1% by mass or more from the viewpoint of resistance uniformity and preferably 10% by mass or less from the viewpoint of compatibility with the crystalline resin.

<Oil-Soluble Dye>

The oil-soluble dye used in the present invention is not especially limited as long as the oil-soluble dye is insoluble or slightly soluble in water and can be homogeneously dispersed in the crystalline resin. Typical examples of the oil-soluble dye include anthraquinone dyes, naphthol dyes, azo dyes, triphenylmethane dyes, phthalocyanine dyes, azine dyes and thioindigo dyes.

Specific examples of the anthraquinone dyes include toluidine blue, C.I. Solvent Blue 11, 12, 35, 59 and 74, 1-aminoanthraquinone, 2-aminoanthraquinone, hydroxyethyl aminoanthraquinone, and C.I. Solvent Violet 47.

Specific examples of the naphthol dyes include Orange 205, C.I. Solvent Yellow 14, and C.I. Solvent Red 26.

Specific examples of the azo dyes include Red 2 (amaranth), Red 40 (Allura Red AC), Red 102 (New Coccine), Yellow 4 (Tartrazine), Yellow 5 (Sunset Yellow FCF), C.I. Solvent Yellow 7, 8, 20, 23 and 107, C.I. Solvent Orange 8 and 14, and C.I. Solvent Black 4.

Specific examples of the triphenylmethane dyes include Blue 1 (Brilliant Blue FCF), Solvent Blue 70, Green 3 (Fast Green FCF), and C.I. Solvent Yellow 30.

Specific examples of the phthalocyanine dyes include C.I. Direct Blue 86, C.I. Basic Blue 140 and long-chain alkyl-modified phthalocyanine.

Specific examples of the azine dyes include C.I. Solvent Black 5, C.I. Solvent Black 7, and Spirit Black SB.

A specific example of the thioindigo dyes includes Blue 2 (Indigo Carmine).

From the viewpoint of suppression of the bleeding of the electrolyte to the belt surface, an oil-soluble dye having any one structure selected from a benzene ring structure, a naphthalene ring structure, a polycyclic aromatic hydrocarbon structure, and an aromatic heterocyclic structure, which are bulky structures, is preferred. Examples of the polycyclic aromatic hydrocarbon structure include structures of anthracene, naphthacene, pentacene, benzopyrene, chrysene, pyrene, triphenylene, corannulene, coronene and ovalene. Examples of the aromatic heterocyclic structure include monocyclic structures of pyrrole, furan, thiophene, imidazole, pyrazole, oxazole, thiazole, pyridine, pyrimidine, pyridazine, pyrazine and triazine, and polycyclic structures of quinoline, quinazoline, phthalazine, pteridine, cumarin, chromone, benzodiazepine, indole, isoindole, benzimidazole, benzofuran, purine, acridine, phenoxazine and phenothiazine.

From the viewpoint of the bulkiness of molecules for suppressing the bleeding of the electrolyte, the oil-soluble dye further preferably has one or more of any one of a naphthalene ring structure, a polycyclic aromatic hydrocarbon structure and a polycyclic aromatic heterocyclic structure per molecule, or has a plurality of benzene ring structures or monocyclic aromatic heterocyclic structures per molecule. Examples of such a dye include anthraquinone dyes, naphthol dyes, azo dyes, azine dyes, triphenylmethane dyes and phthalocyanine dyes.

The content of the oil-soluble dye, based on the total mass of the resin composition, is preferably 0.1% by mass or more from the viewpoint of the suppression of the bleeding of the electrolyte and is preferably 10% by mass or less from the viewpoint of the compatibility with the crystalline resin.

<Additive>

Examples of other components to be contained in the electrophotographic belt of the present invention include: an ionic conducting agent (such as a polymer ionic conducting agent or a surfactant), a conductive polymer, an antioxidant (such as hindered phenol, phosphorus or sulfur antioxidant), an ultraviolet absorber, an organic pigment, an inorganic pigment, a pH adjuster, a crosslinking agent, a compatibilizer, a releasing agent (such as silicone or fluorine releasing agent), a coupling agent, a lubricant, an insulating filler (such as zinc oxide, barium sulfate, calcium sulfate, barium titanate, potassium titanate, strontium titanate, titanium oxide, magnesium oxide, magnesium hydroxide, aluminum hydroxide, talc, mica, clay, kaolin, hydrotalcite, silica, alumina, ferrite, calcium carbonate, barium carbonate, nickel carbonate, glass powder, quartz powder, glass fiber, alumina fiber, potassium titanate fiber, or fine particles of a thermosetting resin), a conductive filler (such as carbon black, carbon fiber, conductive titanium oxide, conductive tin oxide, or conductive mica), and an ionic liquid. These additives may be used singly, or in combination of two or more additives.

<Electrophotographic Belt>

The electrophotographic belt of the present invention contains the aforementioned resin composition. Specifically, for example, the aforementioned resin composition is pelletized, and the resulting pellets of the resin composition are molded by a known molding method such as continuous melt extrusion, injection molding, stretch blow molding or inflation molding, and thus, a seamless electrophotographic belt is obtained. As the molding method for the seamless belt, the continuous melt extrusion or the stretch blow molding can be particularly suitably employed. The continuous melt extrusion may be, for example, an internal cooling mandrel downward extrusion method by which the inner diameter of an extruded tube can be highly precisely controlled, or a vacuum sizing method. A method for producing an electrophotographic belt using the stretch blow molding includes the steps of: molding a preform of the resin composition, heating the preform, loading the heated preform in a seamless belt molding mold and performing stretch molding by allowing a gas to flow into the molding mold, and obtaining a seamless belt by cutting a stretch mold product resulting from the stretch molding.

The thickness of the electrophotographic belt of the present invention is preferably 10 µm or more and 500 µm or less, and particularly preferably 30 µm or more and 150 µm or less. Besides, the electrophotographic belt of the present invention may be not only used as a belt but also used in a way that the belt is wound or coated around a drum, a roll or the like. Furthermore, the surface of the electrophotographic belt of the present invention may be coated with a treating agent for improving the appearance or the release property for a toner or the like, or may be subjected to surface treatment such as polishing treatment.

The application of the electrophotographic belt of the present invention is not especially limited, and the electrophotographic belt may be suitably used as, for example, an intermediate transfer belt, a transport transfer belt, a photoconductive belt or the like. The electrophotographic belt can be particularly suitably used as an intermediate transfer belt. Besides, when the electrophotographic belt is used as an intermediate transfer belt, the volume resistivity of the electrophotographic belt is preferably $1 \times 10^2$ Ωcm or more and $1 \times 10^{14}$ Ωcm or less. If the volume resistivity is $1 \times 10^2$ Ωm or more, extreme lowering of the electrical resistance can be suppressed so as to easily obtain a transfer electric field. As a result, occurrence of roughness or the like in an electrophotographic image can be effectively suppressed.

Furthermore, if the volume resistivity is $1 \times 10^{14}$ Ωcm or less, the increasing of the transfer voltage can be suppressed, and increase in the size of a power source and in costs can be avoided. With some transfer process, however, the transfer can be performed even if the volume resistivity is not within the aforementioned range, and hence, the volume resistivity is not always limited to the aforementioned range.

<Electrophotographic Image Forming Apparatus>

An electrophotographic image forming apparatus using the electrophotographic belt of the present invention will now be described. First, an image forming apparatus of the present embodiment will be described with reference to FIG. 1. The image forming apparatus of the present embodiment has what is called a tandem type configuration in which image forming stations for a plurality of colors are arranged along a rotational direction of the electrophotographic belt of the present invention (hereinafter referred to as the intermediate transfer belt). In the following description, reference signs of the configuration for each of colors of yellow, magenta, cyan and black are provided with indexes respectively of Y, M, C and k, but these indexes may be omitted in describing configurations common to these colors.

Figure 1:
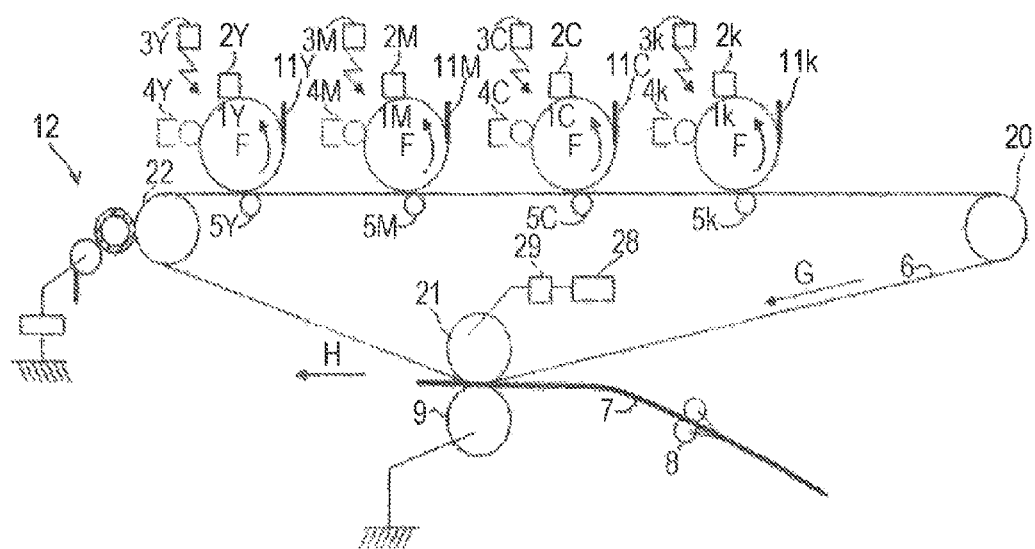
FIG. 1 is a schematic cross-sectional view illustrating an example of a full color image forming apparatus employing an electrophotographic process.

In FIG. 1, reference signs 1Y, 1M, 1C and 1k denote photoconductive drums (photoconductive members or image carrying members), and a charging apparatus 2Y, 2M, 2C or 2k, an exposing apparatus 3Y, 3M, 3C or 3k, a developing apparatus 4Y, 4M, 4C or 4k and the intermediate transfer belt (intermediate transfer member) 6 are arranged around each photoconductive drum 1. The photoconductive drum 1 is rotationally driven in a direction of an arrow F at a prescribed circumferential speed (process speed). The charging apparatus 2 charges the circumferential surface of the photoconductive drum 1 into prescribed polarity and potential (primary charging). A laser beam scanner used as the exposing apparatus 3 outputs laser light on-off keyed according to image information input from an external apparatus such as an image scanner or a computer not shown, so as to scan-expose the charged circumferential surface of the photoconductive drum 1. Through this scan-exposure, an electrostatic latent image according to the image information of an image of interest is formed on the circumferential surface of the photoconductive drum 1.

The developing apparatuses 4Y, 4M, 4C and 4k respectively contain toners of the colors of yellow (Y), magenta (M), cyan (C) and black (k). The developing apparatus 4 to be used based on the image information is selected, and development is performed on the surface of the photoconductive drum 1 with a developer (toner), so as to visualize the electrostatic latent image as a toner image. In the present embodiment, reversal development method for performing development by adhering a toner onto an exposed portion of an electrostatic latent image is thus employed. Besides, the charging apparatuses, the exposing apparatuses and the developing apparatuses as described above together form an image forming unit.

The intermediate transfer belt 6 is an endless belt arranged so as to be in contact with the surface of the photoconductive drums 1 and stretched around a plurality of tension rollers 20, 21 and 22. The intermediate transfer belt 6 is rotated in a direction illustrated with an arrow G. In the present embodiment, the tension roller 20 is a tension roller for controlling the tension of the intermediate transfer belt 6 to be constant, the tension roller 22 is a drive roller for the intermediate transfer belt 6, and the tension roller 21 is an opposed roller for secondary transfer. Besides, primary transfer rollers 5Y, 5M, 5C and 5k are respectively arranged in primary transfer positions opposing the corresponding photoconductive drums with the intermediate transfer belt 6 sandwiched therebetween.

Unfixed toner images of the respective colors formed on the photoconductive drums 1 are successively electrostatically primarily transferred onto the intermediate transfer belt 6 by applying, to the primary transfer rollers 5, a positive primary transfer bias having opposite polarity to the charge polarity of the toner by a constant power source or a constant current source. Thus, a full color image resulting from overlapping the unfixed toner images of the four colors is formed on the intermediate transfer belt 6. The intermediate transfer belt 6 is rotated while carrying the toner image thus transferred from the photoconductive drums 1. Every rotation of each photoconductive drum 1 after the primary transfer, the surface of the photoconductive drum 1 is cleaned for removing a remaining toner by a cleaning apparatus 11, so that an image can be repeatedly formed thereafter.

In a secondary transfer position of the intermediate transfer belt 6 on a conveyance path for a recording material 7, a secondary transfer roller (transfer portion) 9 is brought into contact with a toner image carrying side of the intermediate transfer belt 6. Besides, in the secondary transfer position, the other side of the intermediate transfer belt 6, namely, the side other than the toner image carrying side, is brought into contact with the opposed roller 21, which works as a counter electrode to the secondary transfer roller 9 and is configured such that a DC bias can be applied thereto. In transferring the toner image formed on the intermediate transfer belt 6 onto the recording material 7, a DC bias having the same polarity as the toner is applied to the opposed roller 21 by transfer bias applying unit 28, for example, a voltage of −1,000 to −3,000 V is applied, so as to allow a current of −10 to −50 μA to flow. A transfer voltage attained at this point is detected by transfer high voltage detecting unit 29. Furthermore, a cleaning apparatus (belt cleaner) for removing the toner remaining on the intermediate transfer belt 6 after the secondary transfer is provided downstream from the secondary transfer position.

The recording material 7 introduced to the secondary transfer position is caught in the secondary transfer position, and at this point, a constant voltage bias (transfer bias) controlled to have a prescribed value is applied from the secondary transfer bias applying unit to the opposed roller 21 of the secondary transfer roller 9. By applying the transfer bias having the same polarity as the toner to the opposed roller 21, the full color image (toner image) of the four colors overlapped on the intermediate transfer belt 6 is wholly transferred in the transfer position onto the recording material 7, and thus, a full color unfixed toner image is formed on the recording material. The recording material 7 having the toner image thus transferred is introduced to a fixer not shown for thermally fixing the toner image.

EXAMPLES

The present invention will now be specifically described with reference to examples and comparative examples, but it is noted that the present invention is not limited to these examples. Incidentally, an electrophotographic seamless belt, out of various electrophotographic belts, was produced in each of the examples and the comparative examples. Analysis and measurement of properties were carried out in each of the examples and the comparative examples as follows.

(Measurement Methods and Evaluation Methods for Characteristic Values)

Methods for measuring and evaluating characteristic values of the electrophotographic seamless belt produced in each of the examples and the comparative examples are as follows.

(1) Surface Resistivity (μs)

By using, as a measurement apparatus, a probe (trade name: UR-100, manufactured by Mitsubishi Chemical Analytech Co., Ltd.) having a main electrode with an inner diameter of 50 mm and a guard ring electrode with an inner diameter of 53.2 mm and an outer diameter of 57.2 mm of a high resistivity meter (trade name: Hiresta UP MCP-HT450, manufactured by Mitsubishi Chemical Analytech Co., Ltd.), the surface resistivity was measured according to JIS-K6911. Under application of a voltage of 500 V to the belt for 10 seconds, the surface resistivity was measured in four positions along the circumferential direction of the belt, and an average of the measured values was employed. The thus obtained value was defined as initial electrical resistivity.

The electrophotographic seamless belt obtained in each of the examples and the comparative examples was loaded, as an intermediate transfer belt, in a transfer unit of a tandem type full color electrophotographic image forming apparatus (trade name: LBP-7700C, manufactured by Canon Inc.) having the apparatus configuration as illustrated in FIG. 1, and a solid image of cyan and a solid image of magenta were printed on a transfer medium.

Incidentally, the transfer medium was paper with a rough surface having Ra (arithmetic mean roughness) of 4 μm and Rz (ten-point average roughness) of 15 μm, which was obtained by allowing to stand under an environment of a temperature of 23° C. and relative humidity of 45% for 1 day.

As post-endurance resistivity, the surface resistivity of the electrophotographic belt was measured after printing 100,000 sheets. The thus obtained value was defined as the post-endurance electrical resistivity. The surface resistivity was evaluated based on the following criteria:

Evaluation Criteria:

A: A value obtained by subtracting a logarithm of the initial resistivity from a logarithm of the post-endurance resistivity is smaller than 0.3. This means that the electrolyte has slightly bled.

B: A value obtained by subtracting a logarithm of the initial resistivity from a logarithm of the post-endurance resistivity is 0.3 or more. This means that the electrolyte has largely bled.

The electrical resistivity is considered to be increased, as a result of the bleeding of the electrolyte, as the post-endurance resistivity is higher as compared with the initial resistivity, and therefore, the extent of the bleeding of the electrolyte can be determined by this evaluation.

(2) Transfer Image Characteristic

The electrophotographic seamless belt was loaded, as an intermediate transfer belt, in a transfer unit of a tandem type full color electrophotographic image forming apparatus (trade name: LBP-7700C, manufactured by Canon Inc.) having the apparatus configuration as illustrated in FIG. 1, and a solid image of cyan and a solid image of magenta were printed on a transfer medium. The transfer medium was paper with a rough surface having Ra (arithmetic mean roughness) of 4 μm and Rzjis (ten-point average roughness) of 15 μm, which was obtained by allowing to stand under an environment of a temperature of 23° C. and relative humidity of 45% for 1 day.

The tenth electrophotographic image printed as described above (hereinafter also referred to as "image 1") and the 100,000th electrophotographic image printed as described above (hereinafter also referred to as "image 2") were visually observed for evaluating secondary transfer performance. The evaluation criteria were set as follows:

Evaluation Criteria:

A: No secondary transfer unevenness was observed.

B: Small secondary transfer unevenness was observed over the whole image.

C: Intermediate-level secondary transfer unevenness was observed over the whole image.

(Materials of Resin Compositions Used for Electrophotographic Seamless Belts in the Examples and Comparative Examples)

Materials of resin compositions used in the Examples and the Comparative Examples described later are shown in Tables 1 to 4. With respect to oil-soluble dyes shown in Table 3, structures, out of the benzene ring structure, the naphthalene ring structure, the polycyclic aromatic hydrocarbon structure and the aromatic heterocyclic structure, present in the respective dyes are mentioned. It is noted that the amounts of the respective materials in the respective Examples and Comparative Examples are shown in Tables 5 and 8.

TABLE 1

<Crystalline resin>

| | |
|---|---|
| Resin 1 | Polyethylene naphthalate (Trade name: TN-8050SC, manufactured by Teijin Chemicals Ltd.) Tm: 260° C.; |
| Resin 2 | Polyamide MXD6 (Trade name: S6007, manufactured by Mitsubishi Gas Chemical Company, Inc.) Tm: 243° C.; |

TABLE 2

<Electrolyte>

| | |
|---|---|
| Electrolyte 1 | Fluorine surfactant containing sulfonate (Trade name: Ftergent 100, manufactured by Neos Co., Ltd.) |
| Electrolyte 2 | Fluorine surfactant containing carboxylate (Trade name: Ftergent 150, manufactured by Neos Co., Ltd.) |
| Electrolyte 3 | Fluorine surfactant containing quaternary ammonium salt (Trade name: Ftergent 300, manufactured by Neos Co., Ltd.) |

All of the aforementioned electrolytes 1 to 3 are derivatives of hexafluoropropene oligomer, and are fluorine surfactants that have a perfluoroalkenyl group in the molecule and can be dissociated into anions and cations when mixed with a crystalline resin.

TABLE 3

<Oil-soluble dye>

| | |
|---|---|
| Oil-soluble dye 1 | Azine dye (Trade name: Spirit Black SB, manufactured by Orient Chemical Industries Co., Ltd.), having 2 benzene rings |
| Oil-soluble dye 2 | Azobenzene dye (Trade name: Solvent Yellow 7, manufactured by Wako Pure Chemical Industries Co., Ltd.), having 2 benzene rings |
| Oil-soluble dye 3 | Triphenylmethane dye (Trade name: NUBIAN BLUE PA-4600 (Solvent Blue 70), manufactured by Orient Chemical Industries Co., Ltd.), having 1 naphthalene ring and 2 benzene rings |
| Oil-soluble dye 4 | Anthraquinone dye (Trade name: Toluidine Blue, manufactured by Tokyo Chemical Industry Co., Ltd.) having 1 anthracene ring and 2 benzene rings |
| Oil-soluble dye 5 | Naphthol dye (Trade name: Orange 205, manufactured by Hodogaya Chemical Co., Ltd.), having 1 naphthalene ring and 1 benzene ring |
| Oil-soluble dye 6 | Phthalocyanine dye (Trade name: Direct Blue 86, manufactured by Tokyo Chemical Industry Co., Ltd.), having 4 isoindole rings |

The respective oil-soluble dyes shown in Table 3 have the following chemical structures:

Oil-Soluble Dye 1 (Spirit Black SB (Azine Dye))

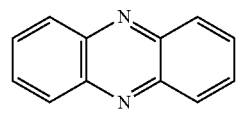 [SMILES: c1ccc2nc3ccccc3nc2c1]

Oil-Soluble Dye 2 (Solvent Yellow 7 (Azobenzene Dye))

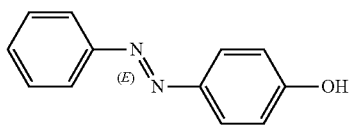 [SMILES: Oc1ccc(/N=N/c2ccccc2)cc1]

Oil-Soluble Dye 3 (Solvent Blue 70 (Triphenylmethane Dye))

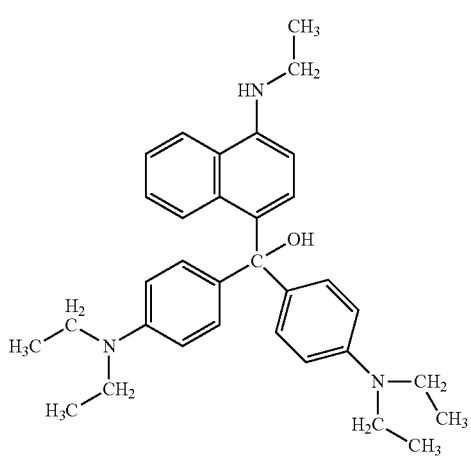 [SMILES: CCNc1ccc(C(O)(c2ccc(N(CC)CC)cc2)c2ccc(N(CC)CC)cc2)c2ccccc12]

Oil-Soluble Dye 4 (Toluidine Blue (Anthraquinone Dye))

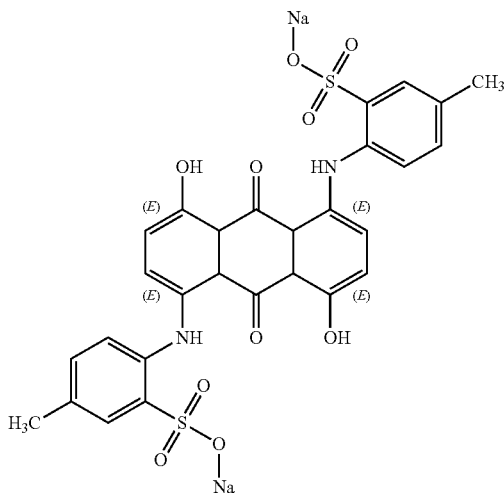

Oil-Soluble Dye 5 (Orange 205 (Naphthol Dye))

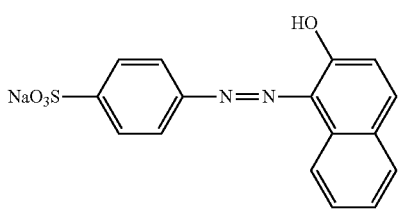

Oil-Soluble Dye 6 (Direct Blue 86 (Phthalocyanine Dye))

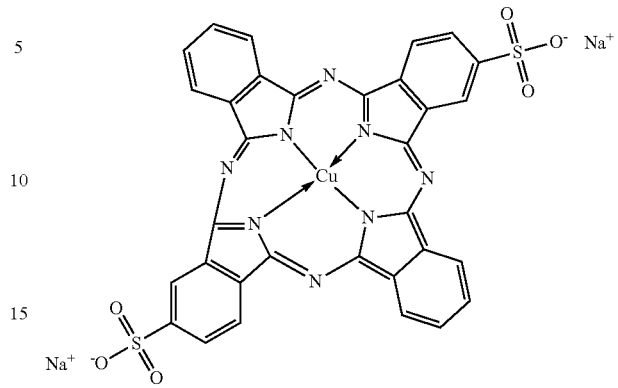

TABLE 4

| <Additive> | |
|---|---|
| Additive 1 | Polyether ester amide (Trade name: Irgastat P20, manufactured by Ciba Specialty Chemicals, Inc.) Tm: 180° C. |
| Additive 2 | Water-soluble dye (Trade name: Acid Black 2, manufactured by Orient Chemical Industries Co., Ltd.) |
| Additive 3 | Carbon black pigment (Trade name: MA100, manufactured by Mitsubishi Chemical Corp.) |

Example 1

Figure 2:
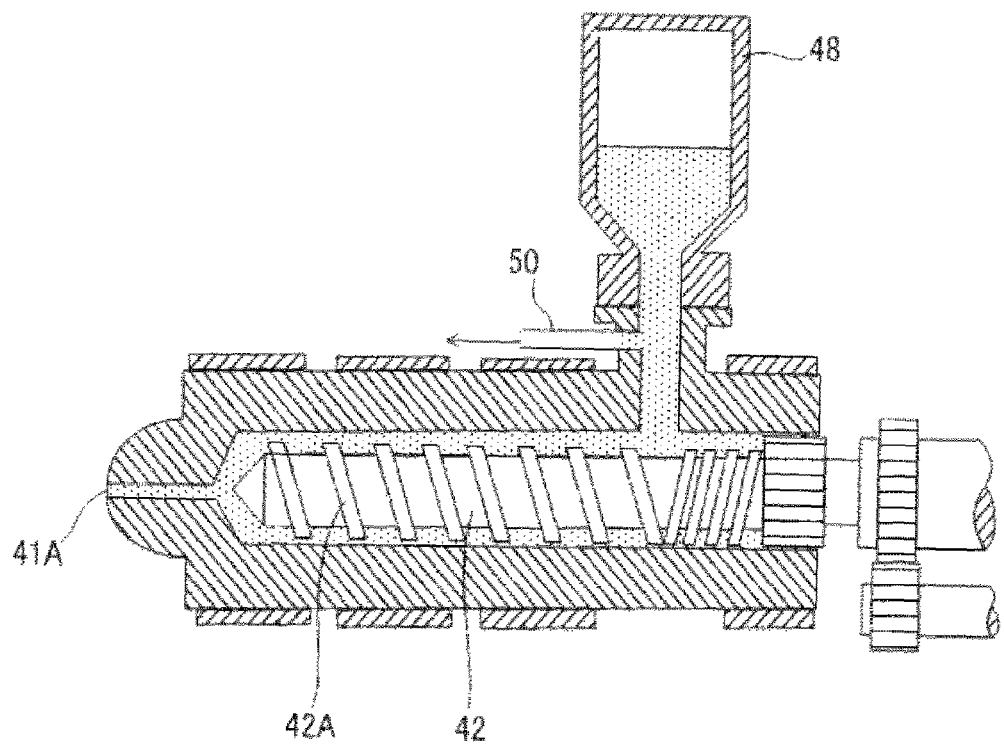
FIG. 2 is a schematic diagram illustrating an example of an injection molding apparatus used in Examples given later.

A resin composition was prepared by melt kneading the materials in the contents shown in Table 5 by using a twin screw extruder (trade name: TEX30a, manufactured by Japan Steel Works Ltd.). The melt kneading temperature was adjusted to be within the range of 260° C. or more to 280° C. or less, and the melt kneading time was about 3 to 5 minutes. The thus obtained resin composition was pelletized, and the resulting pellets were dried at a temperature of 140° C. for 6 hours. Subsequently, the dried pellets of the resin composition were charged in a hopper 48 of an injection molding apparatus having a configuration as illustrated in FIG. 2 (trade name: SE180D, manufactured by Sumitomo Heavy Industries, Ltd.).

With the temperature of a cylinder set to 295° C., the pellets were melted within screws 42 and 42A, and were injection molded through a nozzle 41A into a mold, thereby producing a preform 104. At this point, the temperature of the injection molding mold was set to 30° C.

Figure 3:
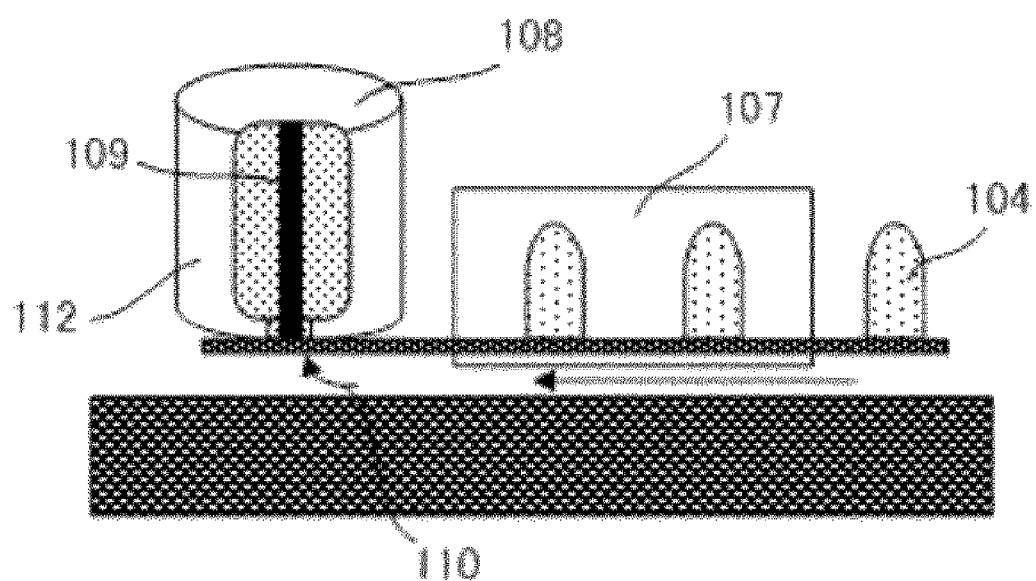
FIG. 3 is a schematic diagram illustrating an example of a stretch blow molding apparatus used in the Examples.

The preform 104 was allowed to enter a preform heating apparatus 107 illustrated in FIG. 3 with a temperature of 500° C. to be softened, and then heated at 500° C. Thereafter, the preform 104 heated to 160° C. was charged in a blow molding apparatus 110 of FIG. 3. Then, the preform was blow molded in a mold for blowing 108 with the mold temperature kept at 110° C. by using a stretching bar 109 and the force of air at a preform temperature of 155° C., an air pressure of 0.3 MPa and a speed of the stretching bar of 1,000 mm/s, thereby obtaining a blow bottle 112. An electrophotographic seamless belt was obtained by cutting the both ends of the blow bottle. The thus obtained seamless belt had a thickness of 80 μm. The evaluation results of this seamless belt are shown in Table 6.

Examples 2 to 11

Electrophotographic seamless belts were obtained in the same manner as in Example 1 except that the contents of the materials of the resin compositions were changed as shown in Table 5. The evaluation results of these seamless belts are shown in Tables 6 and 7.

Example 12

An electrophotographic seamless belt was obtained in the same manner as in Example 1 except that the contents of the materials of the resin composition were changed as shown in Table 5, that the set temperature of the cylinder of the injection molding apparatus was changed to 280° C. and that the preform temperature was changed to 115° C. The evaluation results of the seamless belt are shown in Table 7.

TABLE 5

| | Example | 1 | 2 | 3 | 4 | 5 | 6 | 7 | 8 | 9 | 10 | 11 | 12 |
|---|---|---|---|---|---|---|---|---|---|---|---|---|---|
| Resin Composition | Resin 1 | 83 | 82 | 80 | 82 | 82 | 82 | 82 | 82 | 82 | 82 | 92 | — |
| | Resin 2 | — | — | — | — | — | — | — | — | — | — | — | 83 |
| | Electrolyte 1 | 1 | 2 | 2 | 2 | 2 | 2 | 2 | 2 | — | — | 5 | 1 |
| | Electrolyte 2 | — | — | — | — | — | — | — | — | 2 | — | — | — |
| | Electrolyte 3 | — | — | — | — | — | — | — | — | — | 2 | — | — |
| | Oil-soluble dye 1 | 1 | 1 | 3 | — | — | — | — | — | 1 | 1 | 3 | 1 |
| | Oil-soluble dye 2 | — | — | — | 1 | — | — | — | — | — | — | — | — |
| | Oil-soluble dye 3 | — | — | — | — | 1 | — | — | — | — | — | — | — |
| | Oil-soluble dye 4 | — | — | — | — | — | 1 | — | — | — | — | — | — |
| | Oil-soluble dye 5 | — | — | — | — | — | — | 1 | — | — | — | — | — |
| | Oil-soluble dye 6 | — | — | — | — | — | — | — | 1 | — | — | — | — |
| | Additive 1 | 15 | 15 | 15 | 15 | 15 | 15 | 15 | 15 | 15 | 15 | 15 | 15 |
| | Additive 2 | — | — | — | — | — | — | — | — | — | — | — | — |
| | Additive 3 | — | — | — | — | — | — | — | — | — | — | — | — | unit: parts by mass

TABLE 6

(1) Surface resistivity (ρs)
(2) Transfer image characteristic

| Evaluation item | Example 1 | Example 2 | Example 3 | Example 4 | Example 5 | Example 6 |
|---|---|---|---|---|---|---|
| (1) Initial | $2 \times 10^{11}$ | $9 \times 10^{10}$ | $8 \times 10^{10}$ | $8 \times 10^{10}$ | $9 \times 10^{10}$ | $8 \times 10^{10}$ |
| Post-endurance Evaluation | $2 \times 10^{11}$ | $1 \times 10^{11}$ | $9 \times 10^{10}$ | $9 \times 10^{10}$ | $1 \times 10^{11}$ | $9 \times 10^{10}$ |
| | A | A | A | A | A | A |
| (2) Image 1 | A | A | A | A | A | A |
| Image 2 | A | A | A | A | A | A |

TABLE 7

(1) Surface resistivity (ρs [Ω·cm])
(2) Transfer image characteristic

| Evaluation item | Example 7 | Example 8 | Example 9 | Example 10 | Example 11 | Example 12 |
|---|---|---|---|---|---|---|
| (1) Initial | $8 \times 10^{10}$ | $9 \times 10^{10}$ | $7 \times 10^{10}$ | $8 \times 10^{10}$ | $8 \times 10^{10}$ | $4 \times 10^{11}$ |
| Post-endurance Evaluation | $9 \times 10^{10}$ | $9 \times 10^{10}$ | $9 \times 10^{10}$ | $9 \times 10^{10}$ | $1 \times 10^{11}$ | $5 \times 10^{11}$ |
| | A | A | A | A | A | A |
| (2) Image 1 | A | A | A | A | A | A |
| Image 2 | A | A | A | A | A | A |

Comparative Examples 1 to 7

Electrophotographic seamless belts were obtained in the same manner as in Example 1 except that the contents of the materials of the resin compositions were changed as shown in Table 8. The evaluation results of these seamless belts are shown in Table 9.

Comparative Example 8

An electrophotographic seamless belt was obtained in the same manner as in Example 1 except that the contents of the materials of the resin composition were changed as shown in Table 8, that the set temperature of the cylinder of the injection molding apparatus was changed to 280° C. and that the preform temperature was changed to 115° C. The evaluation results of the seamless belt are shown in Table 9.

TABLE 8

| | Comparative Example | 1 | 2 | 3 | 4 | 5 | 6 | 7 | 8 |
|---|---|---|---|---|---|---|---|---|---|
| Resin Composition | Resin 1 | 84 | 82 | 80 | 82 | 82 | 82 | 82 | — |
| | Resin 2 | — | — | — | — | — | — | — | 84 |
| | Electrolyte 1 | 1 | 2 | 2 | 2 | 2 | — | — | 1 |
| | Electrolyte 2 | — | — | — | — | — | 2 | — | — |
| | Electrolyte 3 | — | — | — | — | — | — | 2 | — |
| | Oil-soluble dye 1 | — | — | — | — | — | — | — | — |
| | Oil-soluble dye 2 | — | — | — | — | — | — | — | — |
| | Oil-soluble dye 3 | — | — | — | — | — | — | — | — |
| | Oil-soluble dye 4 | — | — | — | — | — | — | — | — |
| | Oil-soluble dye 5 | — | — | — | — | — | — | — | — |
| | Oil-soluble dye 6 | — | — | — | — | — | — | — | — |
| | Additive 1 | 15 | 15 | 15 | 15 | 15 | 15 | 15 | 15 |
| | Additive 2 | — | — | 1 | 3 | — | — | 1 | — |
| | Additive 3 | — | — | — | — | 1 | 3 | — | — | unit: parts by mass

TABLE 9

| Evaluation item | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| (1) | Initial | $2 \times 10^{11}$ | $9 \times 10^{10}$ | $8 \times 10^{10}$ | $8 \times 10^{10}$ | $9 \times 10^{10}$ | $7 \times 10^{10}$ | $8 \times 10^{10}$ | $8 \times 10^{11}$ |
| | Post-endurance | $8 \times 10^{11}$ | $6 \times 10^{11}$ | $5 \times 10^{11}$ | $5 \times 10^{11}$ | $5 \times 10^{11}$ | $5 \times 10^{11}$ | $6 \times 10^{11}$ | $7 \times 10^{12}$ |
| | Evaluation | B | B | B | B | B | B | B | B |
| (2) | Initial (image 1) | B | B | B | B | B | B | B | B |
| | Post-endurance (image 2) | C | C | C | C | C | C | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-020642, filed Feb. 5, 2013, which is hereby incorporated by reference herein in its entirety.

What is claimed is:

1. An electrophotographic belt exhibiting electro-conductivity resulting from dissociation of an electrolyte, comprising a resin composition containing:
    a crystalline resin used as a binder resin,
    an oil-soluble dye, and
    an electrolyte.

2. The electrophotographic belt according to claim 1, wherein:
    the oil-soluble dye has any one structure selected from the group consisting of a benzene ring structure, a naphthalene ring structure, a polycyclic aromatic hydrocarbon structure and an aromatic heterocyclic structure.

3. The electrophotographic belt according to claim 2, wherein:
    the oil-soluble dye
        has, in one molecule thereof, one or more of any one structure selected from the group consisting of a naphthalene ring structure, a polycyclic aromatic hydrocarbon structure and a polycyclic aromatic heterocyclic structure, or
        has, in one molecule thereof, a plurality of benzene ring structures or a plurality of monocyclic aromatic heterocyclic structures.

4. The electrophotographic belt according to claim 3, wherein the oil-soluble dye is selected from the group consisting of anthraquinone dyes, naphthol dyes, azo dyes, azine dyes, triphenylmethane dyes and phthalocyanine dyes.

5. The electrophotographic belt according to claim 1, wherein the oil-soluble dye is contained in an amount of 0.1% by mass or more and 10% by mass or less based on a total mass of the resin composition.

6. The electrophotographic belt according to claim 1, wherein the electrolyte is contained in an amount of 0.1% by mass or more and 10% by mass or less based on a total mass of the resin composition.

7. The electrophotographic belt according to claim 1, wherein the resin composition contains, as the electrolyte, a carboxylate or a quaternary ammonium salt.

8. The electrophotographic belt according to claim 1, wherein the electrophotographic belt has a volume resistivity of $1 \times 10^2$ $\Omega$cm or more and $1 \times 10^{14}$ $\Omega$cm or less.

9. An electrophotographic image forming apparatus comprising an intermediate transfer belt, wherein the intermediate transfer belt is the electrophotographic belt according to claim 1.

10. The electrophotographic image forming apparatus according to claim 9, wherein:
    a secondary transfer roller is in contact with a toner image carrying side of the intermediate transfer belt,
    an opposed roller is in contact with a side opposite to the toner image carrying side of the intermediate transfer belt, and
    the opposed roller is configured such that a Direct Current bias is applicable thereto.

* * * * *